Patented Oct. 21, 1941

2,259,862

UNITED STATES PATENT OFFICE 2,259,862

PRODUCTION OF PARAFFINS FROM LOWER BOILING OLEFINS

Jan D. Ruys, Pittsburg, and Bouwe Bolger, Martinez, Calif., assignors to Shell Development Company, San Francisco, Calif., a corporation of Delaware No Drawing. Application October 22, 1938, Serial No. 236,554

8 Claims. (Cl. 260—676)

This invention relates to the conversion of lower boiling olefins to saturated hydrocarbons of higher boiling point. It deals with an improved procedure whereby the yield of desirable products may be materially increased.

An important object of the process of our invention is the production of higher yields of high anti-knock value paraffins boiling within the gasoline range from lower boiling olefins. Another object of our invention is to obtain such yields at the expense of high boiling products less suited to motor fuel use. Still another object of our invention is to react olefins under polymerization conditions and under hydrogenation conditions such that the formation of saturated dimers is favored and the production of undesirable by-products is suppressed.

The process of our invention is particularly adapted to the production of branched chain paraffins boiling within the gasoline range from normally gaseous olefins, and especially to the production of iso-octanes and isododecanes from butenes and pentenes. For the purpose of making our invention more clear it will be described with more particular reference to the manufacture of 2, 2, 4 trimethyl pentane from iso-butylene as the process is particularly suited to this purpose. It will be understood, however, that similar procedures may be used to produce other branched chain octaines from butene-1 and/or butene-2 or from the copolymerization of isobutylene with butene-1 or butene-2 or of amylenes with propylene or to produce branched chain decanes from amylenes whether of secondary or tertiary character or mixtures thereof.

Altho considerable improvement has been made in methods for polymerizing olefins, no commercially practical method has been evolved whereby the formation of undesirable higher boiling polymers resulting from the combination of three or more molecules of the starting olefin or olefins can be entirely avoided. In many cases the proportion of trimers and higher polymers is from 10 to 40% of the total product and represents a serious loss. We have found that this source of loss may be eliminated or greatly reduced by proper control of all stages of the process for producing iso-octane.

The process of our invention comprises the polymerization of an olefin, such, for example, as isobutylene to produce a dimer thereof, by which we mean polymers composed of two molecules of starting olefins whether of like olefins or, as in inter-polymerization, of unlike olefins, together with higher polymerization products and the reaction of the polymerization products under hydrogenation conditions adapted to convert such higher polymerization products to the corresponding saturated dimer, e. g. iso-octane.

While other polymerization methods may be used, we prefer to employ catalytic polymerization using either sulfuric acid as a catalyst in accordance with the procedures described in United States Patents 2,007,159 and 2,007,160 or phosphoric acid polymerization catalyst such as are described in Patent 2,018,065. The olefins used may be employed as the pure or substantially pure chemical individuals or mixtures thereof or more preferably in admixture with the corresponding paraffins. The polymerization may be carried out with the olefin or olefin containing hydrocarbon in either the liquid or vapor phase. By control of the operating conditions tertiary olefins such as isobutylene, trimethyl ethylene, etc., may be selectively polymerized in the presence of less reactive secondary olefins such as propylene, the normal butylenes, and the like, or by using more drastic conditions the polymerization of both types of olefins may be effected. In the latter case the interpolymerization of the tertiary olefin with the secondary olefin is advantageous and may be favored by the use of molecular excess of the less reactive secondary olefin over the tertiary olefin present. Sulfuric acid of about 65% to about 85% concentration at temperatures of about 110° C. to about 80° C. and contact times of about 3 to 10 minutes are preferred for the inter-polymerization of isobutylene with normal butylenes using a ratio of about 1.5 to 0.5 mols of acid per mol of butylenes.

The polymerization products of any of these or other suitable methods of polymerization will contain higher polymerization products in addition to dimers. To obtain high yields of saturated dimers in accordance with our invention the higher polymers are reacted under hydrogenation conditions such that selective controlled depolymerization is effected and saturated dimer is produced. Control of the temperature, pressure and reaction time are important in this step of our process.

For the production of high yields of iso-octane from isobutylene we react the isobutylene polymerization products under hydrogenation conditions at temperatures above about 240° C., preferably 275° C. or above. The temperature is adjusted to the flow rate and the nature of the catalyst used so that substantial reaction of the higher polymers is effected without undesirable decomposition. Temperatures above about 350° C. are generally less preferred as short reaction times must be used and control of the reaction becomes more difficult. In particular cracking and like decomposition reactions which give carbon and other products containing fewer carbon atoms per molecule than the starting olefin are avoided in our process and the reactions are primarily polymerization, depolymerization and hydrogenation. With nickel containing catalysts we prefer to use temperatures below about 300° C., as above this temperature these catalysts tend to lose their activity as hydrogenation catalysts.

We preferably use pressures of about atmospheric or below for reacting the higher polymers altho pressures of 3 to 6 atmospheres may be employed. High pressures are avoided as they tend to suppress the desired depolymerization reaction.

Pressures of the order of about 50 to 100 cms. of mercury absolute give practical conversions on both a percentage and per pass basis.

A wide range of hydrogenation catalysts may be used in the process of our invention altho suitably supported catalysts are preferred. Activated nickel on pumice or on infusorial earth or porcelain or the like is particularly suitable, but other catalysts, such for example, as molybdenum, vanadium, manganese, iron, cobalt, tungsten and the like, individually or as mixtures, with or without promoters such as thoria, ceria, zirconia, titania and the like may be used with the same or different supports. Active metal catalysts may be prepared by reduction of suitable compounds thereof such as the formates and the like as described in U. S. Patent 2,067,368 or in other appropriate ways. Alternatively the metals may be used in the form of compounds. Molybdenum sulfide and the like being particularly advantageous because of their resistance to poisoning.

We prefer to use hydrogen in the proportions of the order of about ½ to 2½ mols of hydrogen per mol of polymer, and to complete the hydrogenation in a second stage at lower temperatures such as are not favorable for the depolymerization effected in the first stage.

The following example illustrating one typical method of applying our invention to the production of iso-octane, shows the advantages, particularly in increased yield, which may be obtained by our process.

A butane-butylene fraction containing about 18.5% isobutylene and 28.2% alpha and beta butylenes, the remainder being substantially butanes, was contacted with 65% sulfuric acid under agitation at about 30–35° C. until approximately 90% of the isobutylene had been selectively absorbed. The absorption product was separated from the unabsorbed hydrocarbons and rapidly heated to a temperature of about 105° C. at which temperature it was maintained for approximately five minutes. The mixture was then cooled and conducted to a settling chamber in which stratification into a sulfuric acid phase and a polymer phase took place. The sulfuric acid phase was continually returned to the isobutylene absorption apparatus while the polymer phase was washed with caustic and distilled. The polymer was found to be made up of approximately 70% di-isobutylene, the remainder being higher isobutylene polymers principally tri-isobutylene. The latter was fed, together with 2 mols of hydrogen per mol of polymer to a tubular reactor charged with an activated nickel catalyst deposited on a kaolin support and immersed in an oil bath maintained at a temperature of about 275° C. The polymer was fed at the rate of about 20 pounds polymer per hour per 100 pounds of catalyst. Under these conditions and at a pressure of 76 cms. mercury, the composition of the product from two different runs was as follows:

Composition of product, percent by volume:

| | | |
|---|---|---|
| $C_4$ fraction | 6.5 | 8 |
| $C_5$ fraction | 3 | 3.5 |
| $C_8$ fraction | 11.5 | 15.5 |
| $C_9$–$C_{11}$ fraction | 3 | 3 |
| $C_{12}$ fraction | 76 | 70 |

Percent saturation of $C_8$ cut............ 69

These data show that 25 to 30% conversion of higher polymers per pass may be readily obtained with 65 to 70% of the converted polymers being depolymerized to di-isobutylene (69% of which was hydrogenated to iso-octane in these operations) and isobutylene. By recirculating the unconverted higher polymers and the isobutylene all may be reacted giving an increase of 21% in the product making the total yield of iso-octane 91% based on the originally reacted isobutylene after completion of the hydrogenation using a supported nickel catalyst at 180° C. The quality of the product obtained is shown by the following comparison of its physical characteristics with those of pure iso-octane.

| | Pure iso-octane | Recovered product |
|---|---|---|
| | °C. | °C. |
| Boiling range | 99.23 | 98.9–100 |
| $d\frac{20}{4}$ | 0.6917 | 0.6918 |
| $n\frac{20}{d}$ | 1.3916 | 1.3917 |

It will be evident from this example that the process of our invention offers many advantages over prior methods of converting lower boiling olefins to high anti-knock value paraffins of suitable boiling range for motor fuel use. In addition to markedly increasing the yield of valuable products the process reduces the cost of polymerization by making exacting control of this step unnecessary. The process may be carried out batchwise, intermittently or continuously. Also the reaction of the higher polymers may be effected in either the presence or absence of the desired dimers initially produced. The reaction of the higher polymers may be carried out in stages with or without separation of reaction products between stages. We prefer, however, to remove the olefin monomers formed in any treatment or stage and return them to the polymerization stage as their conversion to saturated hydrocarbons is not desirable. Still other changes may be made, so it will be clear that our invention is not to be limited to the details of operation disclosed by way of illustration nor by the theory suggested in explanation of the improved results attained, but only by the terms of the accompanying claims in which it is our intention to claim all novelty inherent therein as broadly as possible in view of the prior art.

We claim as our invention:

1. In a process for producing iso-octane from isobutylene by reacting isobutylene with aqueous sulfuric acid under conditions adapted to polymerize isobutylene to di-isobutylene and a minor amount of tri-isobutylene and hydrogenating said di-isobutylene to produce iso-octane the method of increasing the yield of iso-octane which comprises reacting said tri-isobutylene with hydrogen at a temperature above about 275° C. but below 350° C. under a subatmospheric pressure for a time at which iso-octane is produced therefrom, and re-cycling isobutylene simultaneously produced to said polymerization.

2. In a process for producing iso-octane from isobutylene by reacting isobutylene under polymerization conditions adapted to produce a mixture comprising di-isobutylene and higher isobutylene polymers and hydrogenating said di-isobutylene to produce iso-octane the method of increasing the iso-octane yield which comprises reacting said mixture of polymerization products with hydrogen at a temperature above about 240° C. but below 350° C. under a pressure of less than about two atmospheres for a time at which at least a part of said higher polymers are converted to iso-octane and isobutylene.

3. In a process for producing octanes from a butane-butylene fraction containing isobutylene and normal butylenes by reacting said butylenes under inter-polymerization conditions at which octenes and higher polymerization products are produced, and hydrogenating said octenes to produce octanes the method of increasing the yield of octanes which comprises reacting said higher polymerization products with hydrogen under hydrogenation conditions at a temperature above about 240° C. but below 300° C. under a pressure less than 3 atmospheres for a time at which an octane is produced therefrom and separating butylenes simultaneously produced.

4. In a process for producing octanes from butylenes by reacting a butylene with a polymerization catalyst under conditions at which dimers and higher boiling polymers are formed, and hydrogenating said dimers to octanes the method of increasing the yield of octanes which comprises passing said higher boiling polymers at a temperature of about 275° C. and a pressure of 50 to 100 centimeters of mercury absolute with about ½ to 2½ mols of hydrogen per mol of polymer over an active nickel hydrogenation catalyst at the rate of about twenty pounds of polymer per hour per hundred pounds of catalyst, separating a butylene from the octane-containing reaction products and further hydrogenating the butylene dimer produced.

5. In a process for converting normally gaseous olefins of more than two carbon atoms per molecule to paraffins boiling within the gasoline range by contacting said olefins with a polymerization catalyst at a temperature at which polymers boiling above the gasoline range are formed the improvement which comprises, reacting said polymers with hydrogen at a temperature above 240° C. but below 350° C. under a pressure of 50 to 100 centimeters of mercury for a time at which paraffins boiling in the gasoline range are produced, distilling the products of said reaction to separate said products boiling within the gasoline range from higher and lower boiling products, returning lower boiling products to said polymerization, and higher boiling products to reaction under said hydrogenation conditions and further hydrogenating the products boiling within the gasoline range at a lower temperature and a higher pressure.

6. In a process for converting olefins of three to five carbon atoms per molecule to paraffins boiling within the gasoline range by polymerizing such an olefin under conditions at which polymers boiling above the gasoline range are formed the improvement which comprises, reacting said polymers with hydrogen at a temperature above 240° C. but below 350° C. under a pressure of 50 to 100 centimeters of mercury for a time at which paraffins boiling in the gasoline range are produced, separating paraffin containing products boiling within the gasoline range from the reaction products and further hydrogenating the separated products.

7. In a process for producing an octane from a butylene the step of reacting a butylene polymer higher than a dimer with hydrogen at a temperature above about 240° C. but below 300° C. under a pressure less than 3 atmospheres for a time at which depolymerization of said polymer and conversion to said octane takes place.

8. A process for producing iso-octane from tri-isobutylene which comprises reacting tri-isobutylene with hydrogen at a temperature above about 275° C. but below 300° C. and a pressure of 50 to 100 centimeters of mercury absolute for a time at which conversion to iso-octane and isobutylene takes place.

J. D. RUYS.
BOUWE BOLGER.